United States Patent [19]

Bilgrien et al.

[11] Patent Number: 4,962,174

[45] Date of Patent: Oct. 9, 1990

[54] PREPARATION OF ALKOXYSILETHYLENE ENDBLOCKED POLYDIORGANOSILOXANE

[75] Inventors: Carl J. Bilgrien, Midland, Mich.; Daniel T. Berg, LaCrosse, Wis.

[73] Assignee: Dow Corning Corporation, Midland, Mich.

[21] Appl. No.: 466,844

[22] Filed: Jan. 18, 1990

[51] Int. Cl.$^5$ .............................................. C08G 77/06
[52] U.S. Cl. ........................................ 528/15; 528/31; 528/32; 556/479; 525/478
[58] Field of Search ............................. 528/15, 31, 32; 556/479; 525/478

[56] References Cited

U.S. PATENT DOCUMENTS

| | | | |
|---|---|---|---|
| 3,175,993 | 3/1965 | Weyenberg | 260/46.5 |
| 4,687,829 | 8/1987 | Chaffee et al. | 528/17 |
| 4,772,675 | 9/1988 | Klosowski et al. | 528/15 |
| 4,847,400 | 7/1989 | Krahnke et al. | 556/412 |
| 4,871,827 | 10/1989 | Klosowski et al. | 528/15 |

*Primary Examiner*—Melvyn I. Marquis
*Assistant Examiner*—Karen A. Hellender
*Attorney, Agent, or Firm*—Edward C. Elliott

[57] ABSTRACT

A method of producing alkoxysilethylene endblocked polydiorganosiloxane consists essentially of first reacting hydroxyl endblocked polydiorganosiloxane with an excess of a SiH compound having from 2 to 4 SiH groups in the presence of a platinum catalyst, then reacting that product with vinyltrialkoxysilane to give the desired polymer.

5 Claims, No Drawings

PREPARATION OF ALKOXYSILETHYLENE ENDBLOCKED POLYDIORGANOSILOXANE

BACKGROUND OF THE INVENTION

1. Field of the Invention

This invention relates to the preparation of polydiorganosiloxanes having alkoxysilethylene endblocking.

2. Background Information

Weyenberg teaches in U.S. Pat. No. 3,175,993, issued Mar. 30, 1965, polyfunctional siloxanes containing terminal alkoxy groups. A method of preparation is shown which reacts a hydrogen endblocked polydiorganosiloxane with an alkoxy silane having a C=C group in the presence of a platinum catalyst.

Klosowski et al. teach in U.S. Pat. No. 4,772,675, issued Sep. 20, 1988, a method of improving the shelf life of silicone elastomeric sealant. A method of producing an alkoxysilethylene endblocked polymer by reacting a dimethylhydrogensiloxy endblocked polydimethylsiloxane with vinyltrimethoxysilane is shown. A method is shown which reacts a vinyl endblocked polydiorganosiloxane with an endcapping composition of the formula

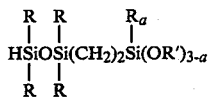

Krahnke et al. teach in U.S. Pat. No. 4,847,400, issued Jul. 11, 1989, a method of producing a polyalkoxysilyl terminated polydiorganosiloxane by reaction of a hydroxyl endblocked polydiorganosiloxane in the presence of an acidic catalyst with a polyalkoxysilylalkylenedisilazane or a polyalkoxysilylalkylenesilylamine.

SUMMARY OF THE INVENTION

Alkoxysilethylene endblocked polydiorganosiloxane is produced by first reacting hydroxyl endblocked polydiorganosiloxane with excess SiH compound having from 2 to 4 SiH groups, then reacting that product with vinyltrialkoxysilane to give the desired polymer.

The method of this invention yields a trialkoxysilethylene endblocked polysiorganosiloxane using easily available starting ingredients in a one-pot process which does not result in any byproduct salts; nor does the polymer have any amine odor present.

DESCRIPTION OF THE INVENTION

This invention relates to a method of producing an alkoxysilethylene endblocked polydiorganosiloxane consisting essentially of (A) Mixing hydroxyl endblocked polydiorganosiloxane with sufficient SiH compound having from 2 to 4 inclusive SiH groups to react with the hydroxyl groups of the polydiorganosiloxane without an appreciable increase in molecular weight of the starting polymer and a platinum catalyst, and heating to a temperature of from 25° C. to 150° C. for a time sufficient to react all of the hydroxyl groups of the polydiorganosiloxane, then (B) stripping the excess SiH compound from the mixture by applying a vacuum of less than 25 mm of mercury and heating to a temperature of from 25 to 150° C., to leave a SiH endblocked polymer, then (C) adding sufficient vinyltrialkoxysilane to react with the SiH groups on the polymer of step (B), heating to a temperature of from 25 to 150° C. for a period of time sufficient to react all of the SiH groups present, then (D) stripping the excess vinyltrialkoxysilane from the mixture by applying a vacuum of less than 25 mm of mercury and heating to a temperature of from 25 to 150C., to leave a trialkoxysilethylene endblocked polydiorganosiloxane.

The method of this invention produces a trialkoxysilethylene endblocked polydiorganosiloxane of the formula

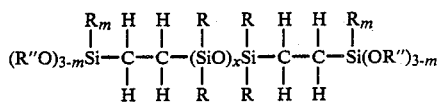

where each R is free of aliphatic unsaturation and is at least one selected from the group consisting of monovalent hydrocarbon, monovalent halohydrocarbon, and monovalent cyanoalkyl radicals of 1 to 18 inclusive carbon atoms, each R" is at least one selected from the group consisting of methyl, ethyl, propyl, and butyl, m is 0 or 1, and x is of a value such that the polymer has a viscosity of from 0.5 to 3000 Pa.s at 25° C. R can be any of those monovalent hydrocarbon, monovalent halohydrocarbon, or monovalent cyano-alkyl radicals of 1 to 18 inclusive carbon atoms which are known to be useful in silicone sealant materials. The preferred radicals are methyl, ethyl, propyl, phenyl, and trifluoropropyl. The preferred viscosity of the polymer is from 1 to 1000 Pa.s at Z5°C. Lower viscosities give cured sealants which are very hard with high modulus because of the high amount of crosslinking while higher viscosities give sealants with a very low extrusion rate.

The hydroxyl endblocked polydiorganosiloxane of step (A) is of the formula

where R and x are as described above. The preferred R is methyl or phenyl, with methyl most preferred. The method of manufacture of these hydroxyl endblocked polydiorganosiloxanes is well known in the art, based upon the hydrolysis of diorganodichlorosilane, the separation of the tetrasiloxane cyclic material from the hydrolysis mixture, and the subsequent polymerization of the cyclic material to the polydiorganosiloxane through the use of an alkaline catalyst.

The SiH compound having from 2 to 4 inclusive Si H groups can be represented by the formula

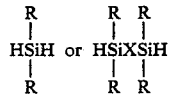

where R is aliphatic hydrocarbon, aromatic hydrocarbon, or silicone group, such as $R_3SiO(R_2SiO-)$. X is an oxygen atom; a divalent hydrocarbon group; a siloxane group, such as $RR_2SiO(R_2SiO)_nR_2Si-$; or X may be absent, to give a disilane. Similar molecules having 3 or 4 SiH bonds may be used, but those having 2 SiH bonds as shown above are preferred. These SiH containing silicon compounds are well known in the art, they can be prepared by many different routes, including their formation in the direct process of converting silicon by reaction with methanol and HCl. The preferred silicon compound is tetramethyldisiloxane having the formula HMe$_2$SiOSiMe$_2$H.

The SiH endblocked polymer in step (B) is reacted in step (C) with vinyltrialkoxysilane of the formula

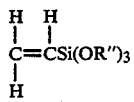

where each R'' is at least one selected from the group consisting of methyl, ethyl, propyl, and butyl. The preferred vinyltrialkoxysilane is vinyltrimethoxysilane.

The simplified process of making an alkoxysilethylene endblocked polydiorganosiloxaue first mixes the hydroxyl endblocked polydiorganosiloxane with the SiH compound. There should be an excess of the SiH compound present so that there is a molar excess of SiH groups as compared to the SiOH groups in the polydiorganosiloxane. The excess should be enough so that there is no appreciable increase in molecular weight of the starting polymer, that is, the SiH compound is not used as a chain extender. The minimum amount would be 2 moles of SiM for each mole of SiOH so, on average, there would be one molecule of the SiH compound added to the polydiorganosiloxane at each SiOH site. In practice, it has been found that 10 moles of SiH for each mole of SiOH works well. The reaction of SiOH and SiH is catalyzed with a platinum catalyst. Any of the well known forms platinum which are suitable for this reaction may be used. A preferred catalyst is the chloroplatinic acid complex of divinyltetramethyldisiloxane diluted with dimethylvinylsiloxy endblocked polydimethylsiloxane to provide 0.7 weight percent platinum. A suitable amount of the catalyst can be easily determined by experimentation, an amount of 12 parts per million platinum, based upon the hydroxyl endblocked polydiorganosiloxane, was found to be useful. The reaction can be carried out at temperatures of from 25 to 150° C., with temperatures of from 50 to 100° C. found preferrable. Higher temperatures cause a faster reaction.

After the reaction has been fully completed, so that no more hydrogen gas is generated, the excess SiH compound is stripped from the mixture by heating under a vacuum of less than 25 mm of mercury and at a temperature of from 25 to 150° C. The stripping conditions used depend upon the exact SiH compound used, with greater vacuum and higher temperatures being used for higher boiling SiH compounds.

When all of the excess SiH compound has been removed, a slight excess of vinyltrialkoxysilane is added to react with the SiH groups present on the polymer ends. A suitable excess is from 1.05 to 3.0 moles of vinyltrialkoxysilane per SiH group present. The SiH to vinyl reaction can be carried out at temperatures of from 25 to 150° C. The time necessary to complete the reaction is lowered by raising the temperature. The reaction should be continued until there are no more SiH groups present in the mixture, which can be monitored by infrared spectroscopy. The excess vinyltrimethoxysilane is then stripped from the mixture by reducing the pressure in the container to less than 25 mm of mercury and heating to a temperature of from 25 to 150° C. until all of the volatile material is removed. The remaining material is the desired trialkoxysilethylene endblocked polydiorganosiloxane.

The trialkoxysilethylene endblocked polydiorganosiloxane produced by the method of this invention is particularly suitable for use in any of the well known compositions which require alkoxy endblocked polydiorganosiloxanes as an ingredient in producing silicone sealants which cure upon exposure to moisture.

The following examples are included for illustrative purposes only and should not be construed as limiting the invention which is properly set forth in the appended claims.

EXAMPLE

A reaction vessel equipped for heating, cooling and vacuum was loaded with 1200 g of hydroxyl endblocked polydimethylsiloxane having a molecular weight of about 58,000 and 0.14 percent by weight of hydroxyl radicals and mixed with 67.3 g of tetramethyldisiloxane to give a 10-fold molar excess of SiH radicals to SiOH radicals. Then 2 ml of a chloroplatinic acid complex of divinyltetramethyldisiloxane diluted with dimethylvinylsiloxy endblocked polydimethylsiloxane to provide 0.7 weight percent platinum was added to provide 12 parts per million platinum based upon the polydimethyisiloxane in the mixture. The mixture was stirred and heated to 50° C. After 45 minutes the evolution of gas ceased, a total of 703 ml of was was collected during this time. A vacuum of 1 mm mercury was applied to the mixture and the mixture was stripped of a total of 51.4 g of volatile fluid, which was collected in a cold trap. The pot was returned to atmospheric pressure and 74.5 g of vinyltrimethoxysilane was added with stirring. The temperature wa raised to 100° C. with stirring continuing. The disappearance of the SiH radicals was monitored by FTIR spectroscopy. After 1 hour no further reduction in absorbance at 2120 cm$^{-1}$ was observed, and the polymer was stripped at 1 mm mercury and 100° C. A total of 43.7 g of volatile fluid was collected in a cold trap.

As a test for alkoxy functionality on the polymer produced, 3 g of the polymer was mixed with 4 drops of tetra butyl titanate. Increased viscosity was immediately evident, and the polymer slowly gelled and Was snappy after 5 minutes.

The polymer was used to make a moisture curing sealant by mixing, in the absence of moisture, 1000 g of the polymer with 70 g of methyltrimethoxysilane, 20 g of 2,5-di-isopropoxy-bis-ethylacetoacetate titanium, and 20 g of an adhesion additive. After mixing until uniform, 90 g of fumed silica having a surface area of about 150 m$^2$/g and 10 g of finely ground titanium oxide were added and mixed until uniform under a vacuum of 27 inches of mercury. The mixture was then transferred to sealed tubes for storage and testing.

The curing characteristics of the sealant were measured after 2 days of normal storage at 25° C. and after 7 days at 70 ° C. The 7 days at 70° C. has been found to approximate a storage period of 1 year at room temperature. The results were as follows:

| Storage | Skin Over Time | Tack Free Time | Slump |
| --- | --- | --- | --- |
| 2 days 25° C. | 7 min. | 30 min. | 0.05 in. |
| 7 days 70° C. | 12 min. | 45 min. | 0.05 in. |

The cured samples were tested for physical properties in accordance with ASTM D 412 with the following results:

| Storage | Cure | Tensile psi | Elongation percent | Modulus psi |
|---|---|---|---|---|
| 2 days 25° C. | 3 days 25° C. | 240 | 218 | 185 |
| 2 days 25° C. | 10 days 25° C. | 248 | 256 | 197 |
| 7 days 70° C. | 3 days 25° C. | 138 | 255 | 109 |

A comparative sealant made from a similar formulation but using a hydroxyl endblocked polymer and methyltrimethoxysilane crosslinker was evaluated with the following results:

| Storage | Cure | Tensile psi | Elongation percent | Modulus psi |
|---|---|---|---|---|
| 2 days 25° C. | 3 days 25° C. | 241 | 608 | 80 |
| 7 days 70° C. | failed to cure after 10 days | | | |

The above examples illustrate that an alkoxysilethylene endblocked polymer was formed and that a sealant manufactured with such a polymer has a storage stability much improved over that of a sealant manufactured from a conventional alkoxy endblocked polymer.

That which is claimed is:

1. A method of producing an alkoxysilethylene endblocked polydiorganosiloxane consisting essentially of (A) mixing hydroxyl endblocked polydiorganosiloxane with sufficient SiH compound having from 2 to 4 inclusive SiH groups to react with the hydroxyl groups of the polydiorganosiloxane without an appreciable increase in molecular weight of the starting polymer and a platinum catalyst, then heating to a temperature of from 25 to 150° C. for a time sufficient to react all of the hydroxyl groups of the polydiorganosiloxane, then (B) stripping the excess SiH compound from the mixture by applying a vacuum of less than 25 mm of mercury and heating to a temperature of from 25 to 150° C., to leave a SiH endblocked polymer, then (C) adding sufficient vinyltrialkoxysilane to react with the SiH groups on the polymer of step (B), heating to a temperature of from 25 to 150° C. for a period of time sufficient to react all of the SiH groups present, then (D) stripping the excess vinyltrialkoxysilane from the mixture by applying a vacuum of less than 25 mm of mercury and heating to a temperature of from 25 to 150° C., to leave a trialkoxysilethylene endblocked polydiorganosiloxane.

2. The method of claim 1 in which the SiH compound used in step (A) is a tetraalkyldisiloxane.

3. The method of claim 2 in which the tetraalkyldisiloxane is tetramethyldisiloxane.

4. The method of claim 3 in which the vinyltrialkoxysilane is vinyltrimethoxysilane.

5. The method of claim 1 in which the reaction temperature of step (A) is from 50 to 100° C.

* * * * *